United States Patent
Hallundbæk

(10) Patent No.: US 9,435,167 B2
(45) Date of Patent: Sep. 6, 2016

(54) DOWNHOLE DRIVING UNIT HAVING A HYDRAULIC MOTOR IN A WHEEL

(75) Inventor: Jørgen Hallundbæk, Græsted (DK)

(73) Assignee: WELLTEC A/S, Allerød (DK)

( * ) Notice: Subject to any disclaimer, the term of this patent is extended or adjusted under 35 U.S.C. 154(b) by 489 days.

(21) Appl. No.: 14/008,190

(22) PCT Filed: Mar. 29, 2012

(86) PCT No.: PCT/EP2012/055649
§ 371 (c)(1),
(2), (4) Date: Sep. 27, 2013

(87) PCT Pub. No.: WO2012/130947
PCT Pub. Date: Oct. 4, 2012

(65) Prior Publication Data
US 2014/0014368 A1     Jan. 16, 2014

(30) Foreign Application Priority Data
Mar. 30, 2011 (EP) .................................. 11160505

(51) Int. Cl.
*E21B 23/04* (2006.01)
*B60K 7/00* (2006.01)
(Continued)

(52) U.S. Cl.
CPC ............ *E21B 23/04* (2013.01); *B60K 7/0015* (2013.01); *E21B 4/02* (2013.01); *E21B 4/18* (2013.01);
(Continued)

(58) Field of Classification Search
CPC .... E21B 2023/008; E21B 23/00; E21B 4/00; E21B 4/18
See application file for complete search history.

(56) References Cited

U.S. PATENT DOCUMENTS

| 2,742,991 A | 4/1956 | Gilbert et al. |
| 3,320,828 A | 5/1967 | Grant |

(Continued)

FOREIGN PATENT DOCUMENTS

| EP | 2 129 864 A1 | 12/2009 |
| RU | 2 175 374 C1 | 10/2001 |

(Continued)

OTHER PUBLICATIONS

International Preliminary Report on Patentability issued in International Patent Application No. PCT/EP2012/055649 mailed on Oct. 1, 2013.

(Continued)

*Primary Examiner* — Shane Bomar
(74) *Attorney, Agent, or Firm* — Nixon & Vanderhye P.C.

(57) ABSTRACT

The present invention relates to a downhole driving unit (11) for insertion into a well, comprising a driving unit housing (51), an arm assembly (60) movable between a retracted position and a projecting position in relation to the driving unit housing, an arm activation assembly (41) arranged in the driving unit housing for moving the arm assembly between the retracted position and the projecting position and a wheel assembly (90) comprising a stationary part (91) and a rotational part (92), the stationary part being connected with or forming part of the arm assembly and being rotatably connected with a rotational part. The wheel assembly comprises a hydraulic motor comprising a hydraulic motor housing (93) and a rotatable section (84) connected with the rotational part for rotating part of the wheel assembly. Furthermore, the present invention relates to a downhole system comprising said driving unit and to use of such driving unit.

18 Claims, 15 Drawing Sheets

(51) Int. Cl.
*E21B 4/18* (2006.01)
*E21B 23/00* (2006.01)
*E21B 4/02* (2006.01)
*E21B 29/00* (2006.01)
*B60K 17/04* (2006.01)

(52) U.S. Cl.
CPC ............. *E21B 23/00* (2013.01); *E21B 29/002* (2013.01); *B60K 17/046* (2013.01); *B60K 2007/0038* (2013.01); *B60K 2007/0092* (2013.01); *B60Y 2200/60* (2013.01); *E21B 2023/008* (2013.01)

(56) References Cited

U.S. PATENT DOCUMENTS

| | | | |
|---|---|---|---|
| 3,439,766 A | | 4/1969 | Dence et al. |
| 3,480,099 A | * | 11/1969 | Hunck ................. B60K 7/0015 180/243 |
| 3,969,950 A | | 7/1976 | Rau et al. |
| 4,192,380 A | | 3/1980 | Smith |
| 5,391,059 A | * | 2/1995 | Hallund ................ F01B 13/061 417/273 |
| 6,273,189 B1 | * | 8/2001 | Gissler ...................... E21B 4/04 166/241.1 |
| 7,143,843 B2 | * | 12/2006 | Doering ................... E21B 4/18 175/24 |
| 8,739,891 B2 | | 6/2014 | Ferkingstad et al. |
| 2005/0145415 A1 | * | 7/2005 | Doering .................... E21B 4/18 175/24 |
| 2005/0217867 A1 | * | 10/2005 | Misselbrook ........... E21B 17/20 166/384 |
| 2010/0263856 A1 | | 10/2010 | Lynde et al. |
| 2013/0068479 A1 | * | 3/2013 | AlDossary .............. E21B 23/14 166/381 |
| 2014/0014367 A1 | * | 1/2014 | Hallundbæk ........ B60K 7/0015 166/381 |
| 2015/0300113 A1 | * | 10/2015 | Guttormsen ........... E21B 23/00 166/65.1 |

FOREIGN PATENT DOCUMENTS

| | | |
|---|---|---|
| RU | 2 236 549 C2 | 9/2004 |
| RU | 2 353 751 C2 | 4/2009 |
| SU | 1493774 A1 | 7/1989 |
| WO | WO 00/46481 | 8/2000 |
| WO | WO 2010/123375 A1 | 10/2010 |

OTHER PUBLICATIONS

International Search Report for PCT/EP2012/055649 mailed May 16, 2012.
Written Opinion of the International Searching Authority mailed May 16, 2012.
First Office Action mailed Sep. 29, 2015 in Chinese Application No. 201280016170.8, with English translation (14 pages).

* cited by examiner

DOWNHOLE DRIVING UNIT HAVING A HYDRAULIC MOTOR IN A WHEEL

This application is the U.S. national phase of International Application No. PCT/EP2012/055649 filed 29 Mar. 2012 which designated the U.S. and claims priority to EP 11160505.1 filed 30 Mar. 2011, the entire contents of each of which are hereby incorporated by reference.

FIELD OF THE INVENTION

The present invention relates to a downhole driving unit for insertion into a well, comprising a driving unit housing, an arm assembly movable between a retracted position and a projecting position in relation to the driving unit housing, an arm activation assembly arranged in the driving unit housing for moving the arm assembly between the retracted position and the projecting position and a wheel assembly comprising a stationary part and a rotational part, the stationary part being connected with or forming part of the arm assembly and being rotatably connected with a rotational part. Furthermore, the present invention relates to a downhole system comprising said driving unit and to use of such driving unit.

BACKGROUND ART

When operating in a downhole well, tools used for the operation may not be submergible themselves. Some tools are positioned at the front of coiled tubing and are driven forward by pushing the tubing further down the well. Other tools are lowered into the well by means of a wireline, and gravity will thus ensure that the tool submerges. Hence, not all tools are capable of moving in the well and thus need to be moved forward in the well by an additional tool. In particular, this is the case in the horizontal part of the well, as gravity cannot aid in the movement.

Several tools have been developed for this purpose, inter alia one running on a caterpillar track. However, this tool has the disadvantage that it cannot always hold its footing in the more uneven parts of the well, and in some cases it is impossible for such a tool to pass a place where two well pipes meet but do not abut hence leaving a gap. Another tool has wheels driven by means of a roller chain and all driven by one motor. However, if the motor is unable to drive all wheels, the tool is unable to drive itself any further. This may be the case if the well has an obstacle and one wheel is unable to be driven across the obstacle.

SUMMARY OF THE INVENTION

It is an object of the present invention to wholly or partly overcome the above disadvantages and drawbacks of the prior art. More specifically, it is an object to provide an improved downhole tool for moving an operational tool forward in all parts of a well.

The above objects, together with numerous other objects, advantages, and features, which will become evident from the below description, are accomplished by a solution in accordance with the present invention by a downhole driving unit for insertion into a well, comprising:
 a driving unit housing,
 an arm assembly movable between a retracted position and a projecting position in relation to the driving unit housing,
 an arm activation assembly arranged in the driving unit housing for moving the arm assembly between the retracted position and the projecting position, and
 a wheel assembly for driving the driving unit forward in the well, comprising a stationary part and a rotational part, the stationary part being connected with or forming part of the arm assembly and being rotatably connected with a rotational part,
wherein the wheel assembly comprises a hydraulic motor comprising a hydraulic motor housing and a rotatable section connected with the rotational part for rotating part of the wheel assembly.

By having a motor enclosed in a hydraulic motor housing in the wheel assembly, roller chains or caterpillar tracks can be avoided. By having a closed housing, dirt from the well fluid in which the driving unit propels itself does not get stuck in the chain or caterpillar track, destroying the function of the wheel.

In one embodiment, the driving unit comprises several arm assemblies, each connected in one end with the driving unit housing and in another end with a wheel assembly.

By having the motor directly in the wheel, each wheel can drive the driving unit forward independently of the other wheels of the driving unit. When passing an obstacle, the arm assembly nearest to the obstacle is pressed towards the driving unit housing as the other wheels drive the driving unit forward. Thus, the driving unit is capable of passing most obstacles in the well or casing. Furthermore, when passing a gap, e.g. between two tubular casings, the wheels not situated in the gap drive the driving unit forward and thus, the driving unit is able to propel itself in almost all parts of the well.

By having movable arm assemblies which may be retracted into the driving unit housing, the driving unit is capable of passing an obstacle as earlier described and the driving unit is capable of propelling itself forward in wells having an inner diameter varying within a larger range than if the arms were not movable. When the operation is performed, the arm assemblies are retracted into the housing and the driving unit is removed from the well by dragging a wireline connected to the driving unit.

In one embodiment, the stationary part and the rotational part may constitute the hydraulic motor housing.

In another embodiment, the wheel assembly may further comprise a planetary gearing system.

In one embodiment, the planetary gearing system may be comprised in the hydraulic motor housing.

Also, the wheel assembly may comprise a wheel ring.

Furthermore, the rotatable section of the hydraulic motor may be connected with a sun gear of the planetary gearing system.

Said planetary gearing system may be comprised in the hydraulic motor housing.

Moreover, the sun gear of the planetary gearing system may drive a plurality of planet gears which are connected through a carrier member for driving a ring gear of the planetary gearing system.

In an embodiment, the wheel ring may comprise the ring gear, enabling the planet gears to engage and drive the wheel ring.

In addition, the wheel ring may be closed from one end by a closing member.

Additionally, the wheel ring may comprise the closing member.

Also, the aforementioned planetary gearing system may comprise a ring gear constituted by the wheel ring or the closing member.

Furthermore, the rotatable section may comprise a first sun gear of the planetary gearing system driving a plurality of planet gears which are connected through a carrier member being connected with or comprised in the wheel ring, the stationary part may comprise a ring gear of the planetary gearing system, and the ring gear may engage the planet gears.

Said the rotatable section of the hydraulic motor may be connected with the planet gears and the planet gears may be driven by the rotatable section.

In one embodiment, the stationary part may comprise the sun gear of the planetary gearing system.

In another embodiment, the rotational part may comprise the wheel ring and may be driven by the planet gears.

The rotatable section of the hydraulic motor may comprise a first sun gear of the planetary gearing system and the first sun gear may drive a plurality of first planet gears which are connected through a carrier member.

Also, the carrier member of the planetary gearing system may drive a plurality of second planet gears and the carrier member may comprise the sun gear engaging and driving the second planet gears.

Moreover, the second planet gears may be connected by means of a second carrier member being part of the rotational part for rotating part of the wheel assembly.

In an embodiment, the second carrier member may be connected with the rotational part of the wheel assembly or may be part of the rotational part.

The stationary part may comprise the ring gear of the planetary gearing system engaging the first planet gears and the second planet gears.

Additionally, the arm assembly may comprise a wheel arm and the wheel arm may comprise fluid channels for providing fluid to and from the hydraulic motor through the stationary part.

Further, the hydraulic cylinder block may comprise fluid channels arranged in alignment with the fluid channels in the wheel arm so that fluid may be led from the wheel arm to cylinders in the hydraulic cylinder block.

The downhole driving unit according to the present invention may further comprise a pump for providing fluid to the hydraulic motor.

In one embodiment, the hydraulic motor may be a radial piston motor.

Said hydraulic motor may comprise a cam ring connected with or forming part of the stationary part of the wheel assembly.

Additionally, the rotatable section may be a hydraulic cylinder block.

Also, the hydraulic motor may comprise pistons movable within cylinders in the hydraulic cylinder block.

Furthermore, the driving unit having several arm assemblies may have a longitudinal centre axis and the arm assemblies may be connected with the driving unit housing having a distance to the centre axis and opposite side of the centre axis. When having at least three arm assemblies, they are arranged in a zigzag pattern along the centre axis in a plane.

In addition, the driving unit may be connected to a wireline and the arm assemblies may project from the driving unit housing having an angle less than 90° from the longitudinal axis of the driving unit. The arm assemblies may face backwards in relation to the wireline.

The present invention further relates to a downhole system comprising a driving unit and an operational tool connected with the driving unit for being moved forward in a well or borehole.

Said operational tool may be a stroker tool, a key tool, a milling tool, a drilling tool, a logging tool, etc.

Moreover, the present invention relates to a use of the driving unit according to the invention in a well or borehole for moving itself and/or an operational tool forward in a well or borehole.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
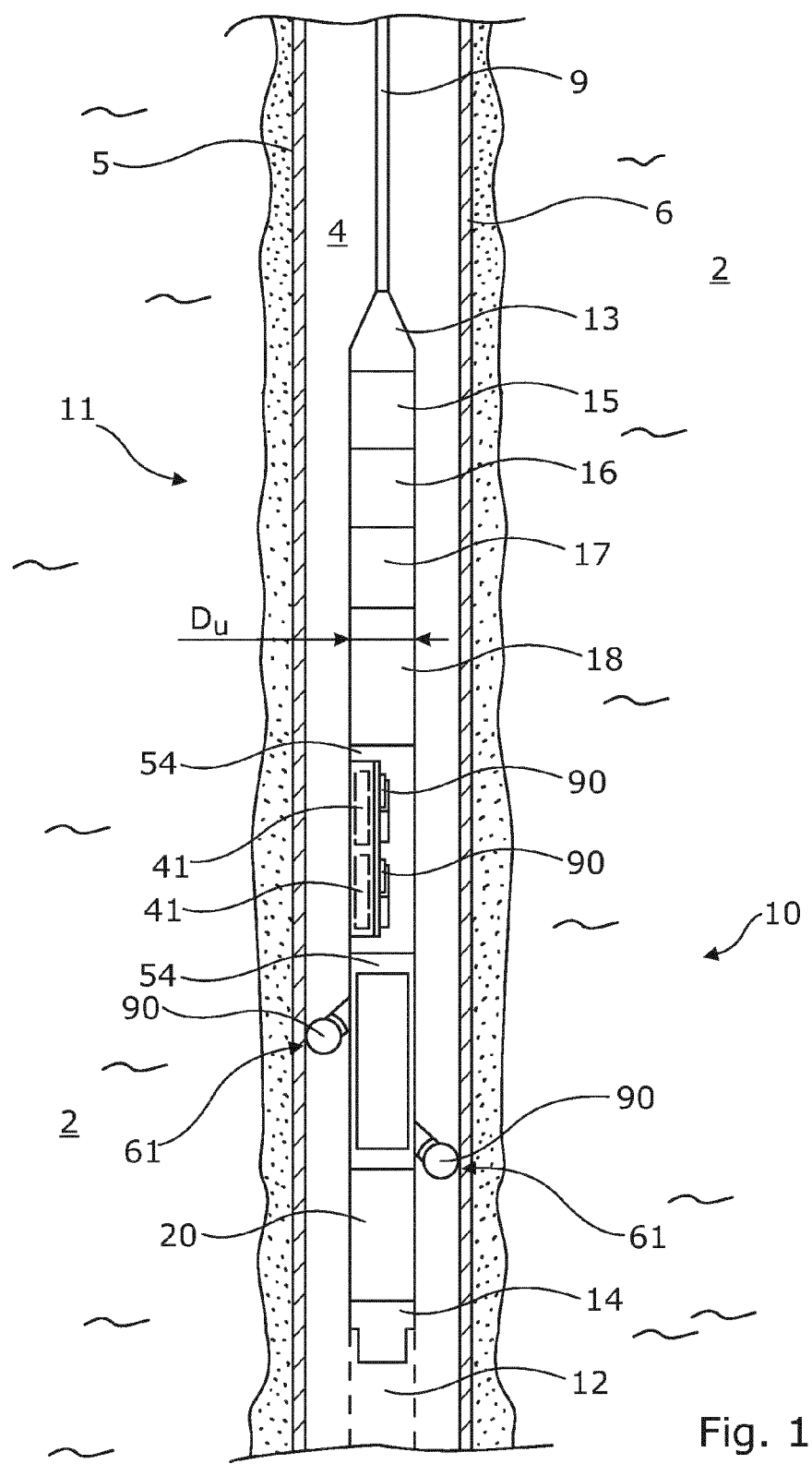
FIG. 1 shows a downhole tool such as a driving unit in a well.

FIG. 1 shows a downhole tool 10, such as driving unit 11 arranged in a casing 6, having an inside 4, in a well or borehole 5 in the formation 2. The downhole tool is powered through a wireline 9 which is connected with the tool via a top connector 13. The downhole tool further comprises an electronic section having mode shift electronics 15 and control electronics 16 before the electricity is supplied to an electrical motor 17 driving a hydraulic pump 18. In FIG. 1, the downhole tool is a driving unit 11 having a driving unit housing 51 in which arm assemblies 60 are moved between a retracted position and projecting position in relation to the driving unit housing 51 along a longitudinal axis of driving unit 11 by means of fluid from the hydraulic pump 18. In FIG. 1, the arm assembly is shown in its projecting position. The driving unit 11 is divided in several sections 54 and is connected with a compensating device 20 for compensating the pressure within the driving unit so that a high pressure does not result in the driving unit housing bulging outwards or collapsing inwards.

The arm assemblies 60 are moved in and out of the driving unit housing between the projecting and retracted position by means of an arm activation assembly 41 arranged in the driving unit housing 51 as indicated by the dotted lines. The arm activation assemblies 41 are driven by the hydraulic pump for moving the arm assemblies 60 through a hydraulic cylinder. The downhole driving unit 11 is most often used for moving an operational tool into a specific position in the well or just forward in the well while an operation is performed, such as moving a logging tool forward while logging fluid and formation data in order to optimise the production of oil fluid from the well. Another operational tool could be a stroker tool providing an axial force in one or more strokes, a key tool opening or closing valves in the well, positioning tools such as a casing collar locator (CCL), a milling tool or drilling tool, etc. The operational tool is connected through a connector 14.

Figure 2:
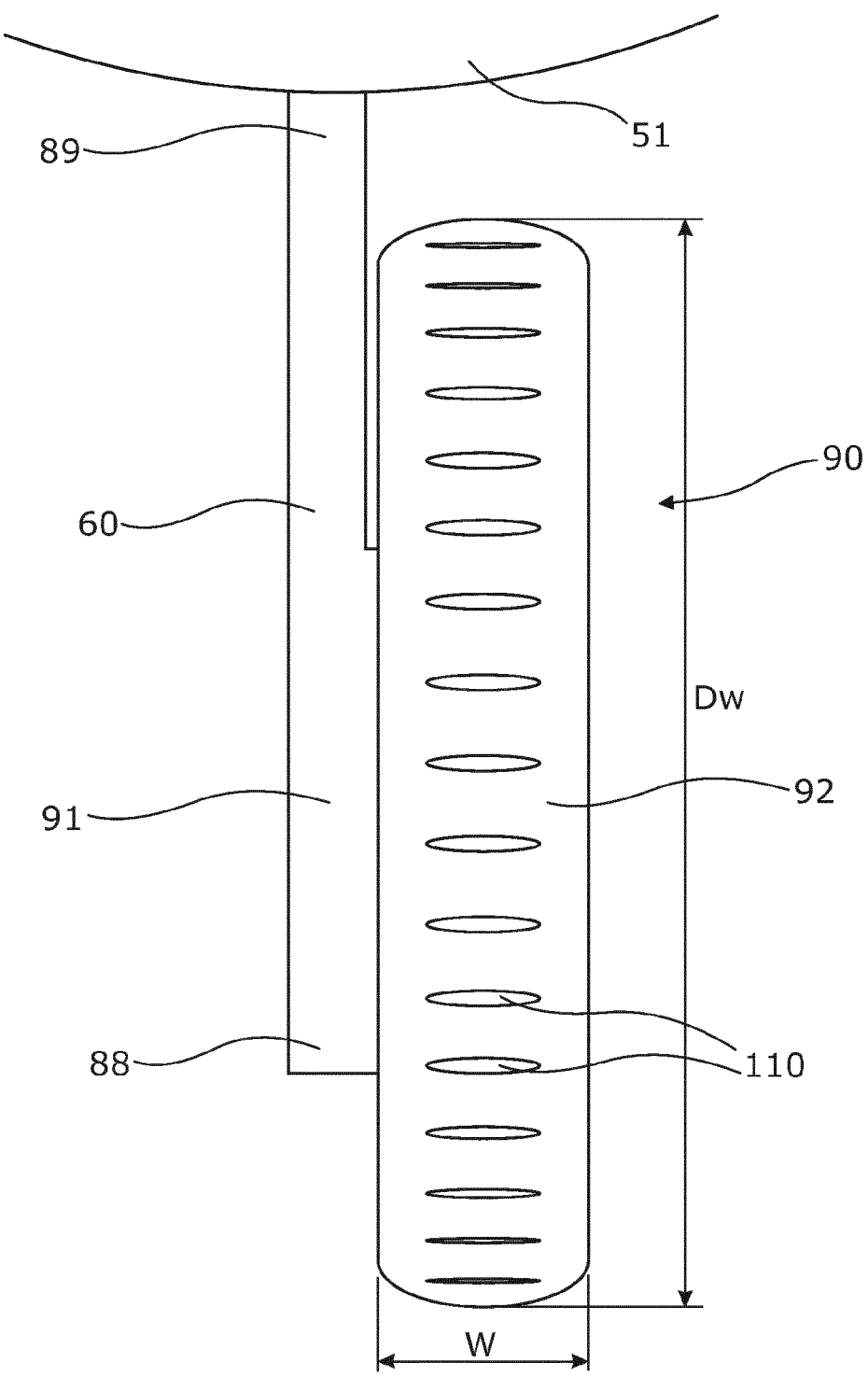
FIG. 2 shows a wheel arranged on a wheel arm.

The driving unit 11 is insertable into a well and propels itself forward and is thus capable of moving an operational tool forward in the well. To be able to propel itself and the operational tool 12, the driving unit comprises several wheel assemblies 90, each arranged in a first end of the arm assembly 60 furthest away from the driving unit housing 51 when the arm is in its projecting position, as shown in FIG. 2. The wheel assembly comprises a stationary part 91 and a rotational part 92. The stationary part 91 is fixedly connected with the arm assembly or forms part of the arm assembly and is rotatably connected with the rotational part. The rotational part 92 is connected with or forms part of a wheel ring 99, which is the outermost part of the wheel assembly 90 contacting an inner surface of the casing 6 or borehole 5. The wheel assembly rotates around a wheel rotation axis 33. In order to propel itself forward in the well, each wheel assembly 90 comprises a hydraulic motor 23. The hydraulic motor 23 has a hydraulic motor housing 93 and a rotatable section 84 connected with the rotational part 92 for rotating part of the wheel assembly 90 and thus drive the wheel ring 99 and the driving unit 11 forward in the well. On its outside, the wheel ring 99 has indentations 110 to obtain a better grip in the casing wall or the borehole wall as shown in FIG. 2. The wheel ring 99 may also have any other friction enhancing means, such as spikes or grooves, and the wheel ring may comprise friction enhancing means made of rubber, elastomer, etc.

Figure 3:
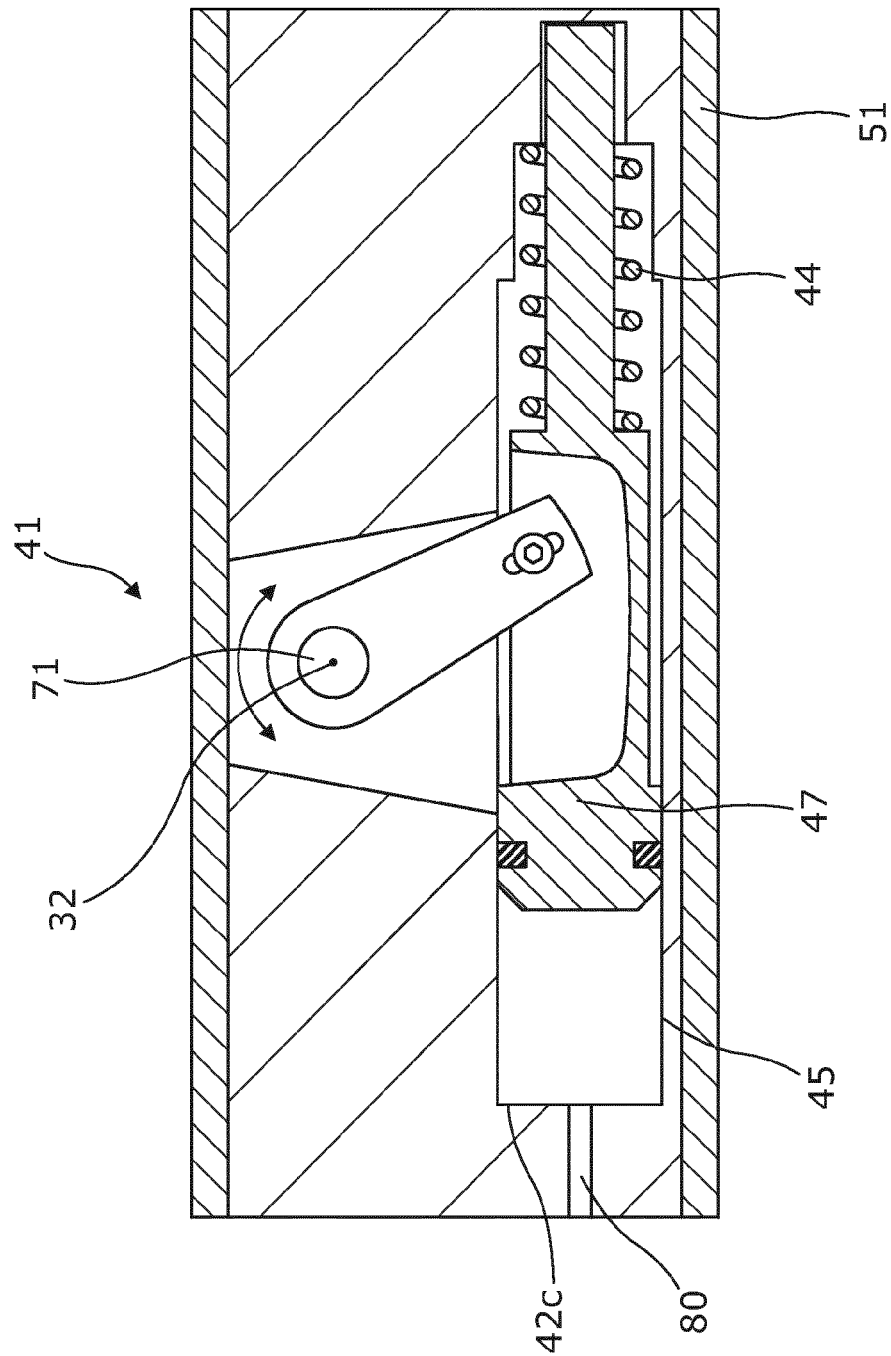
FIG. 3 shows an arm activation assembly.

In FIG. 3, the arm activation assembly is shown arranged in the driving unit housing 51 as indicated in FIG. 1 for moving the arm assemblies between a retracted position and a projecting position. The arm assembly is fastened to one end of a crank member 71 which is rotated around a rotation axis 32 as indicated by arrows. This end is rotationally connected in relation to the housing, and the other end of the crank member is moved along the longitudinal axis of the driving unit 11 by means of a piston 47 moving in a piston housing 45. The piston is moved in a first direction by means of hydraulic fluid supplied through channel 80 by means of the pump and in an opposite and second direction by means of a spring member 44.

Figure 4A:
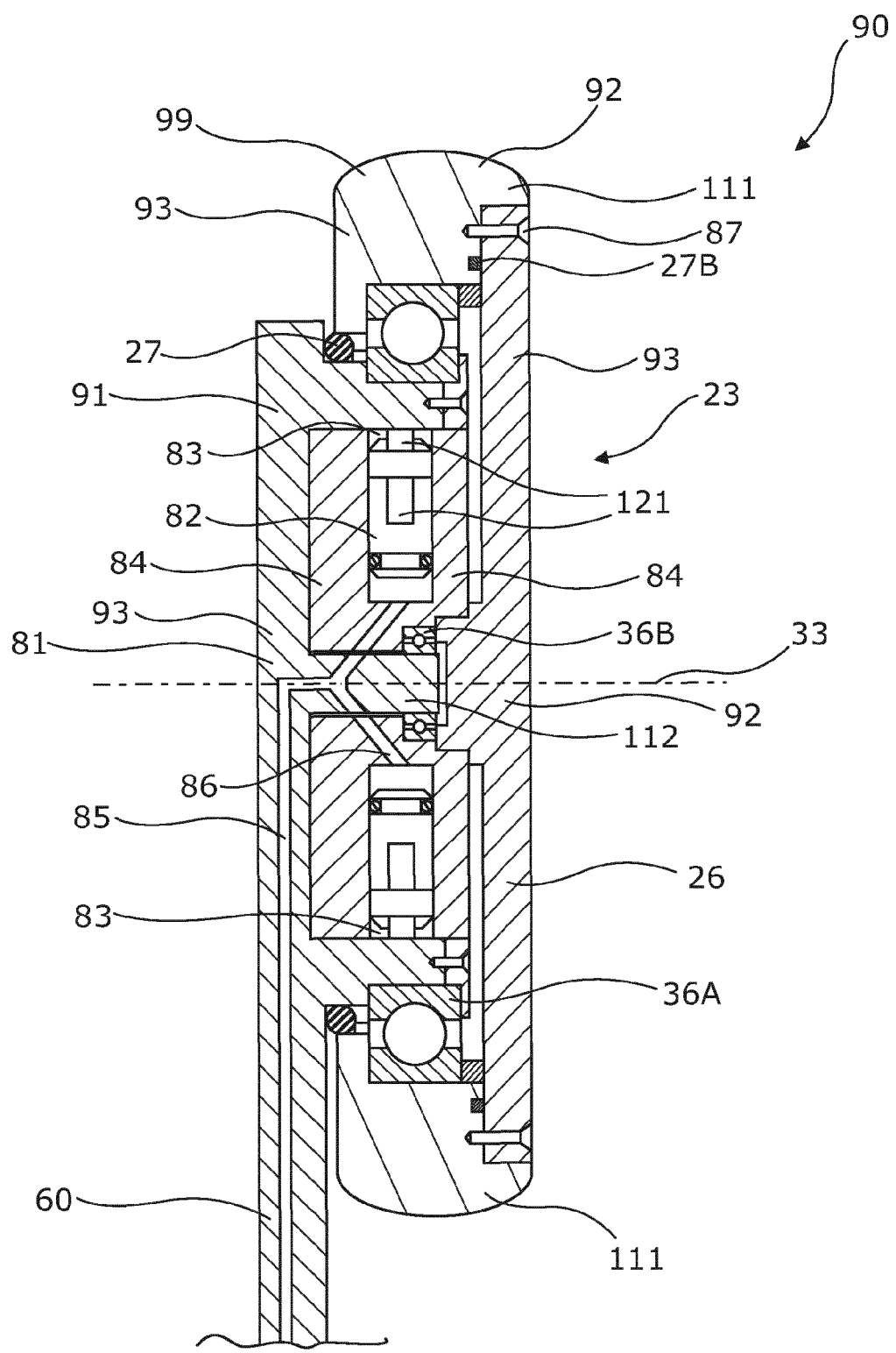
FIG. 4A shows a cross-sectional view of the wheel.
Figure 4B:
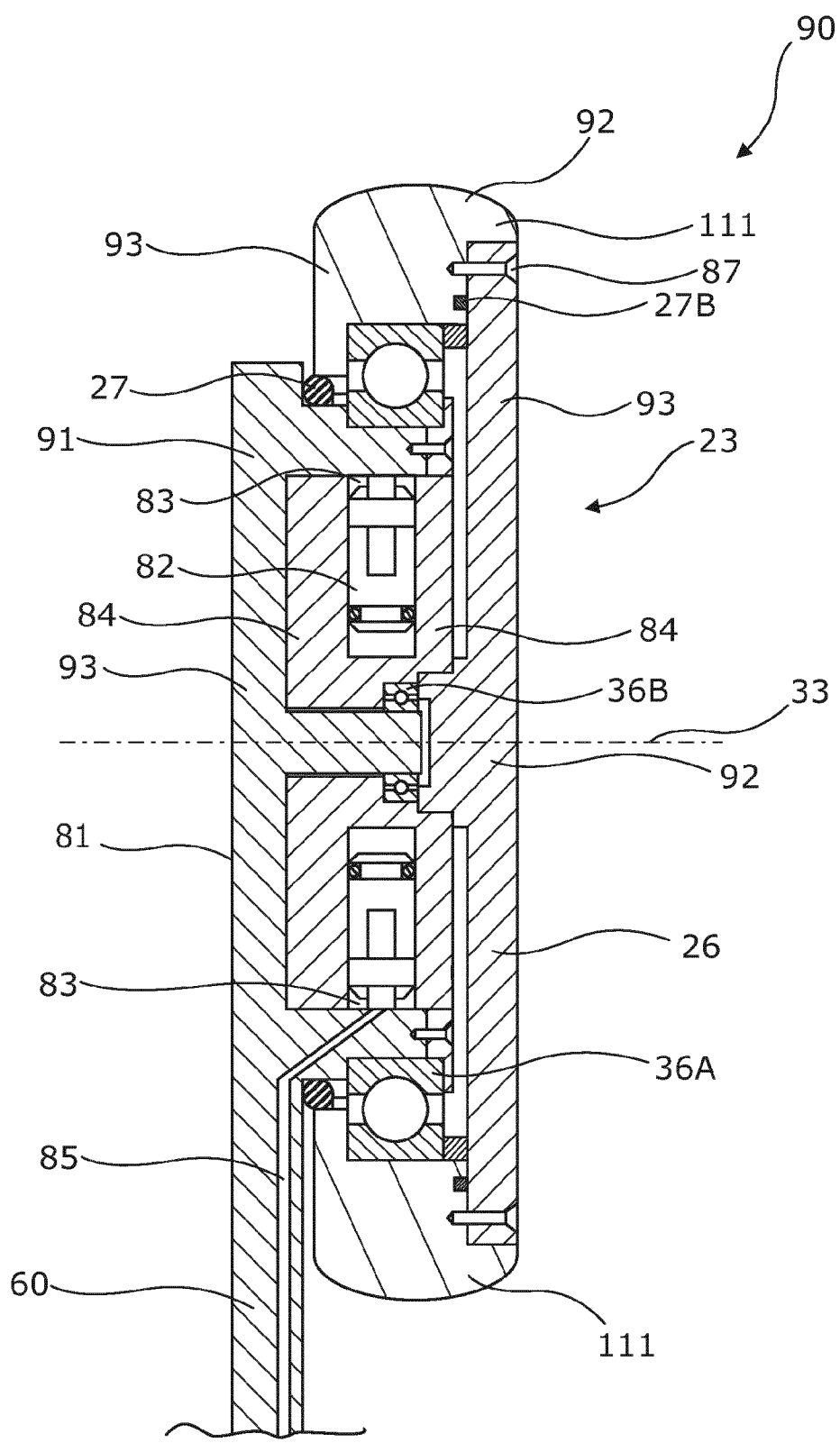
FIG. 4B shows another cross-sectional view of the wheel of FIG. 4A.

In FIGS. 4A and 4B, the hydraulic motor 23 is a radial piston motor in which the rotatable section 84 is a hydraulic cylinder block having cylinders 83 in which at least four pistons 82 move radially in relation to a wheel rotational axis 34 of the wheel assembly 90. The arm assembly 60 comprises a wheel arm 81 and the wheel arm 81 comprises fluid channels 85 for providing fluid to and from the hydraulic motor 23 through the stationary part 91 of the wheel assembly 90. The hydraulic motor housing 93 of the hydraulic motor 23 is constituted by the stationary part 91 and the rotational part 92 of the wheel assembly 90. The wheel assembly 90 comprises a closing member 26 closing the wheel ring 99 from one end 111, and the hydraulic motor 23 is thus enclosed by the wheel arm 81, the wheel ring 99, the closing member 26 and sealing members 27 therebetween to provide a sealed connection and a substantially tight hydraulic motor housing. In this way, well fluid surrounding the driving unit 11 is kept out of the hydraulic motor housing 93. The hydraulic motor 23 is thus comprised in the same housing as the wheel assembly so that the motor housing and the wheel housing are the same housing and thus the same fluid chamber. The solution of the present invention is thus very compact in order that the arm assembly 60 with the wheel assembly 90, when retracted in the driving unit housing, only takes up little space, so that the diameter of the driving unit 11 and thus of the downhole tool is not substantially increased when there are wheels at the end of the arms 60 of the driving unit 11.

The driving unit 11 has a unit diameter $D_u$, as shown in FIG. 1, and the wheel assembly 90 has a wheel diameter $D_w$ and a width W, as shown in FIG. 2, the width W being less than ½ the unit diameter, preferably less than ⅓ the unit diameter, more preferably less than ¼ the unit diameter.

Figure 5A:
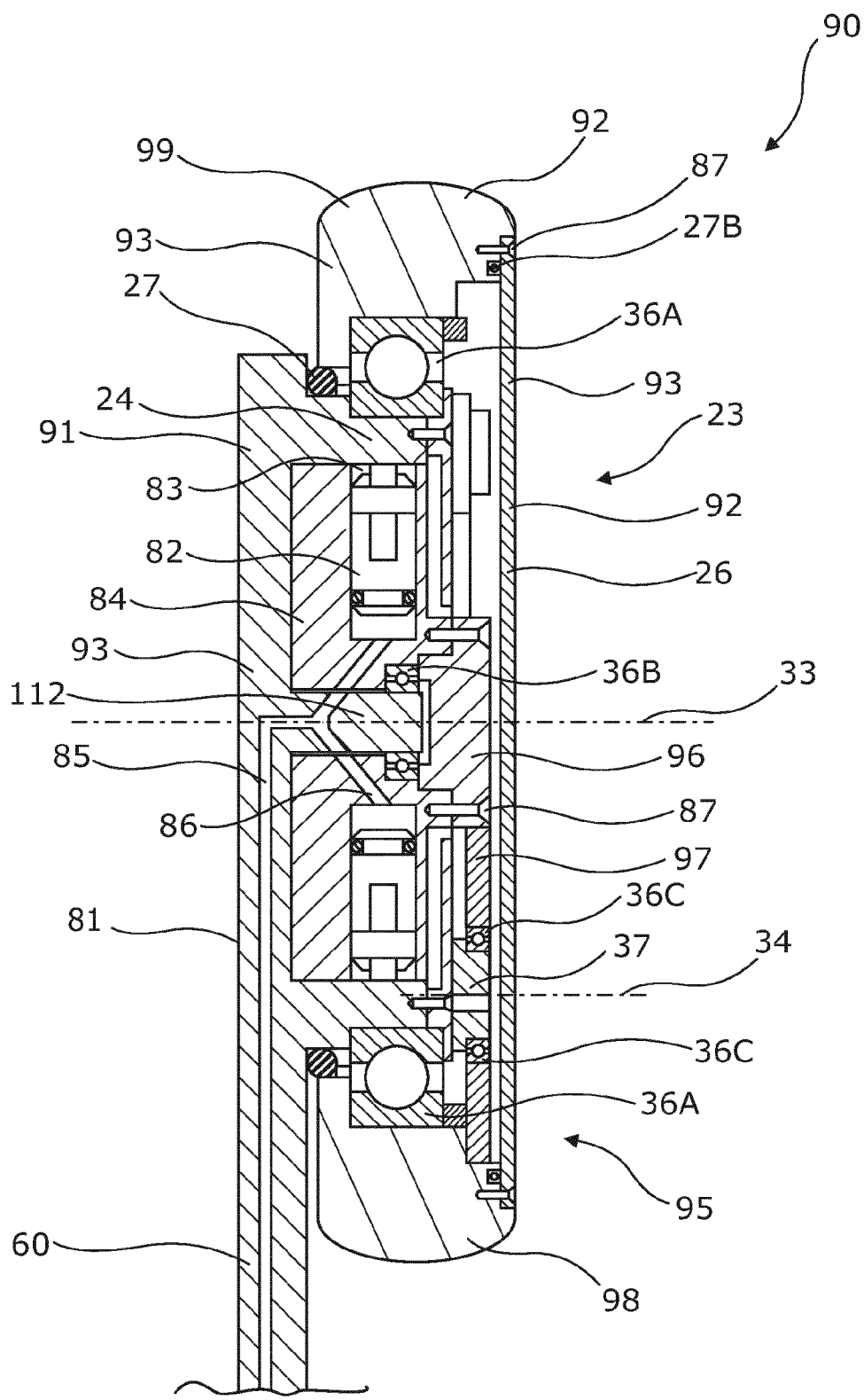
FIG. 5A shows a cross-sectional view of another embodiment of the wheel.
Figure 5B:
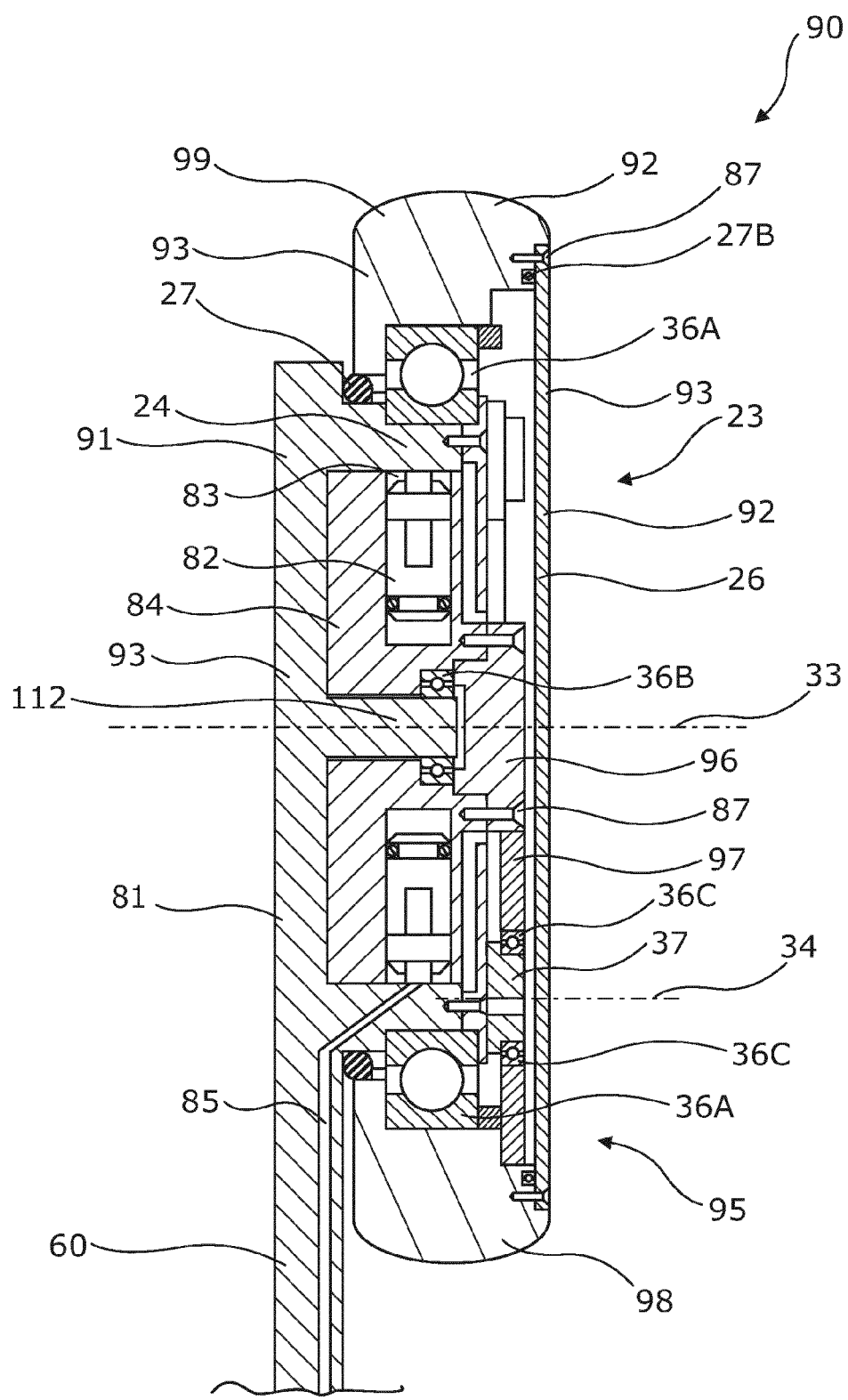
FIG. 5B shows another cross-sectional view of the wheel of FIG. 5A.

The hydraulic motor 23 comprises a cam ring 24 forming part of the stationary part 91 of the wheel assembly 90. In FIGS. 4A and 5A, the pistons move in the cylinders and are forced outwards by the hydraulic fluid from the fluid channel 86 in the hydraulic cylinder block 84. This is due to the fact that the fluid channels 85 in the stationary part 91 in FIGS. 4A and 5A are arranged opposite fluid channels 86 in the hydraulic cylinder block 84 so that fluid flows into the back of the cylinder and forces the piston outwards. Other pistons in the hydraulic cylinder block 84 are moved in the opposite direction by lobes in the cam ring forcing the pistons back into the cylinder as shown in FIGS. 4B and 5B. In FIGS. 4B and 5B, other fluid channels 85 in the stationary part 91 are arranged opposite the front of the cylinder so that fluid in the cylinder can be emptied and the piston moved towards the centre of the hydraulic cylinder block 84. In this way, the hydraulic cylinder block rotates. The cam ring 24 is thus stationary and the hydraulic cylinder block rotates the rotational part 92 of the wheel assembly 90. A ball bearing 36A is arranged between the wheel ring 99 and the stationary part 91 on the outside of the cam ring 24, enabling the wheel ring 99 to rotate.

Furthermore, a ball bearing 36B is arranged between a projecting shaft 112 of the stationary part 91 of the wheel assembly 90 and the rotatable section 84 of the hydraulic motor 23. The shaft is stationarily arranged inside the hydraulic cylinder block and forms part of the wheel arm 81 or is connected with the wheel arm 81. The ball bearing 36B is arranged around the shaft and in a recess in the hydraulic motor block.

Figure 6A:
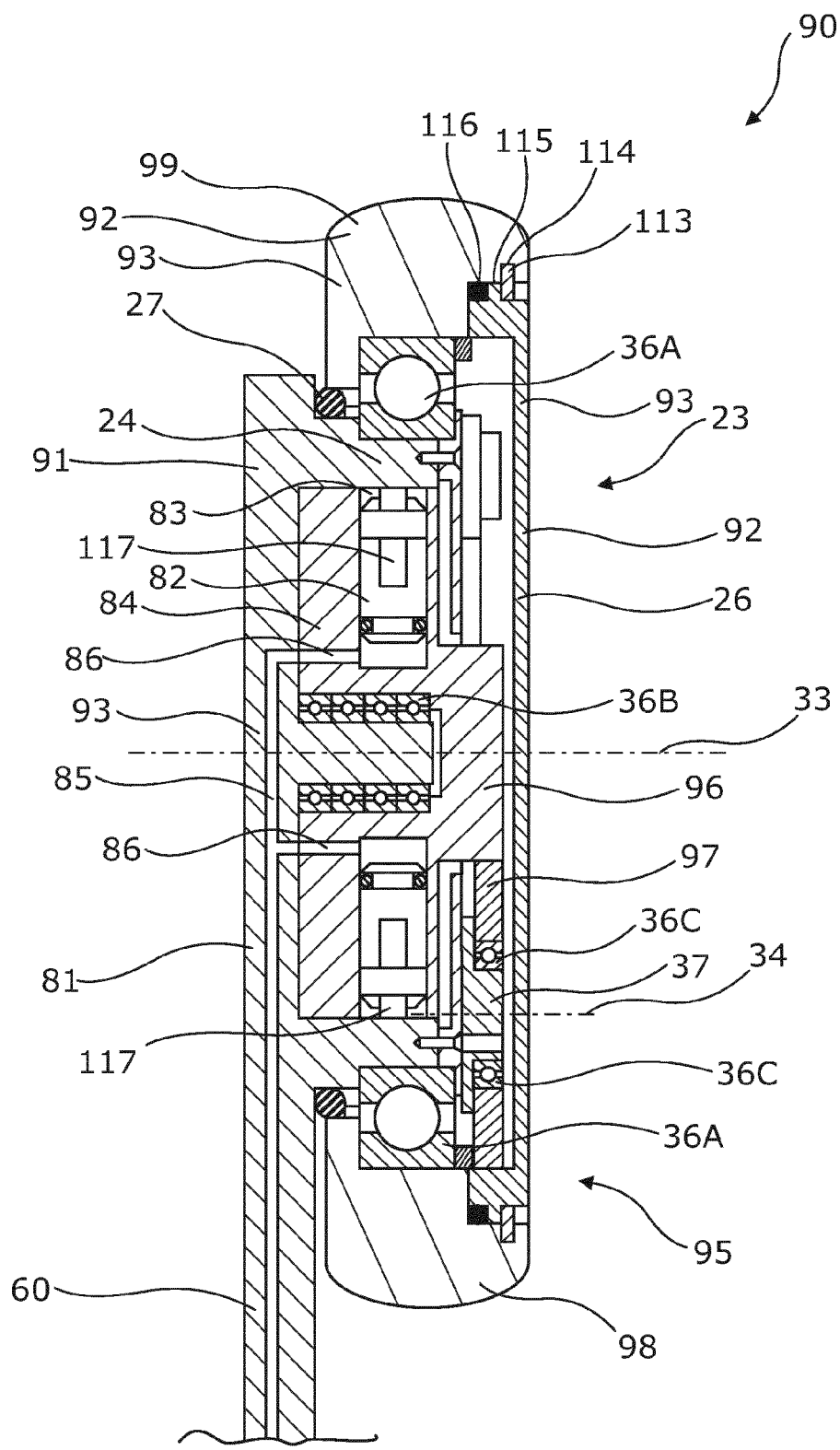
FIG. 6A shows a cross-sectional view of another embodiment of the wheel.

In FIGS. 4A-5B, the closing member 26 is fastened to the wheel ring 99 by means of a screw but may be fastened in any other suitable manner. The closing member 26 has indentations matching recesses in the hydraulic cylinder block for transmitting the rotational force from the hydraulic cylinder block to the wheel ring 99. In FIGS. 4A and 4B, the hydraulic cylinder block drives the wheel ring via the closing member 26. The closing member 26 may be fastened in any other suitable manner for transmitting the rotational force from the hydraulic cylinder block. In FIG. 6A, the closing member 26 is fastened to the wheel ring 99 by means of a snap ring 113 arranged in a groove 114 of the wheel ring 99 to keep a projecting flange 115 of the closing member firmly fastened to the wheel ring 99. Between the flange of the closing member 26 and the wheel ring 99, a sealing member 116 is arranged for sealing the motor housing 93.

In FIGS. 5A and 5B, the wheel assembly comprises a planetary gearing system 95. The planetary gearing system 95 comprises a sun gear 96 fastened to the rotatable hydraulic cylinder block by means of screws. The sun gear 96 drives the planet gears 97 which are connected through a carrier member 37, such as a carrier plate, enabling the carrier member 37 to drive a ring gear 98 of the planetary gearing system 95. The wheel ring 99 comprises the ring gear 98 allowing the planet gears 97 to engage and drive the wheel ring 99. The planet gears 97 rotate around a planet gear rotational axis 34 and are rotatably connected with the carrier plate 37 through a ball bearing 36C arranged between a projecting part of the carrier plate and a hole in the planet gear. The planet gears mesh with the wheel ring 99 functioning as the ring gear 98 of the planetary gearing system 95. The carrier member 37 is screwed into the stationary part 91 and is thus stationary.

The planetary gearing system 95 is comprised in the hydraulic motor housing 93 and is connected directly to the hydraulic motor block. Thus, the hydraulic fluid inside the hydraulic cylinder block also surrounds the gears of the planetary gearing system 95 as they are comprised in the same motor housing. By arranging the planetary gearing system 95 directly in the hydraulic motor housing 93, the width of the wheel along the rotational axis 33 of the wheel assembly 90 is substantially reduced in relation to a solution where a planetary gearing system is arranged outside the hydraulic motor housing in e.g. a separate housing comprising the motor housing 93. A small wheel width provides a smaller diameter of the driving unit 11, enabling the driving unit to enter also small diameter wells.

The closing member 26 in FIGS. 5A and 5B is fastened to the wheel ring 99 by means of screws 87, and sealing members 27B are provided in a recess in the wheel ring 99. And when fastening the closing member to the wheel ring, the sealing member is squeezed in between the closing member 26 and the wheel ring 99 to provide a fluid-tight connection therebetween. This is also the case when a snap ring 113 is used for fastening the closing member 26.

In FIG. 6A, the sun gear 96 is provided as part of the hydraulic cylinder block. The planet gears mesh with the closing member which, accordingly, functions as the ring gear 98 in the planetary gearing system 95. Thus, the wheel ring 99 is driven by the hydraulic cylinder block by driving the planet gears which drive the closing member 26 driving the wheel ring 99. The planet gears 97 are connected through the carrier plate which is connected to the stationary part 91, thus making it stationary. Furthermore, four ball bearings 36B are arranged between the projecting part 112 of the stationary part 91 and the rotatable section 84 of the hydraulic motor 23. In this way, the sun gear 96 can be made as part of the rotatable section 84.

Figure 6B:
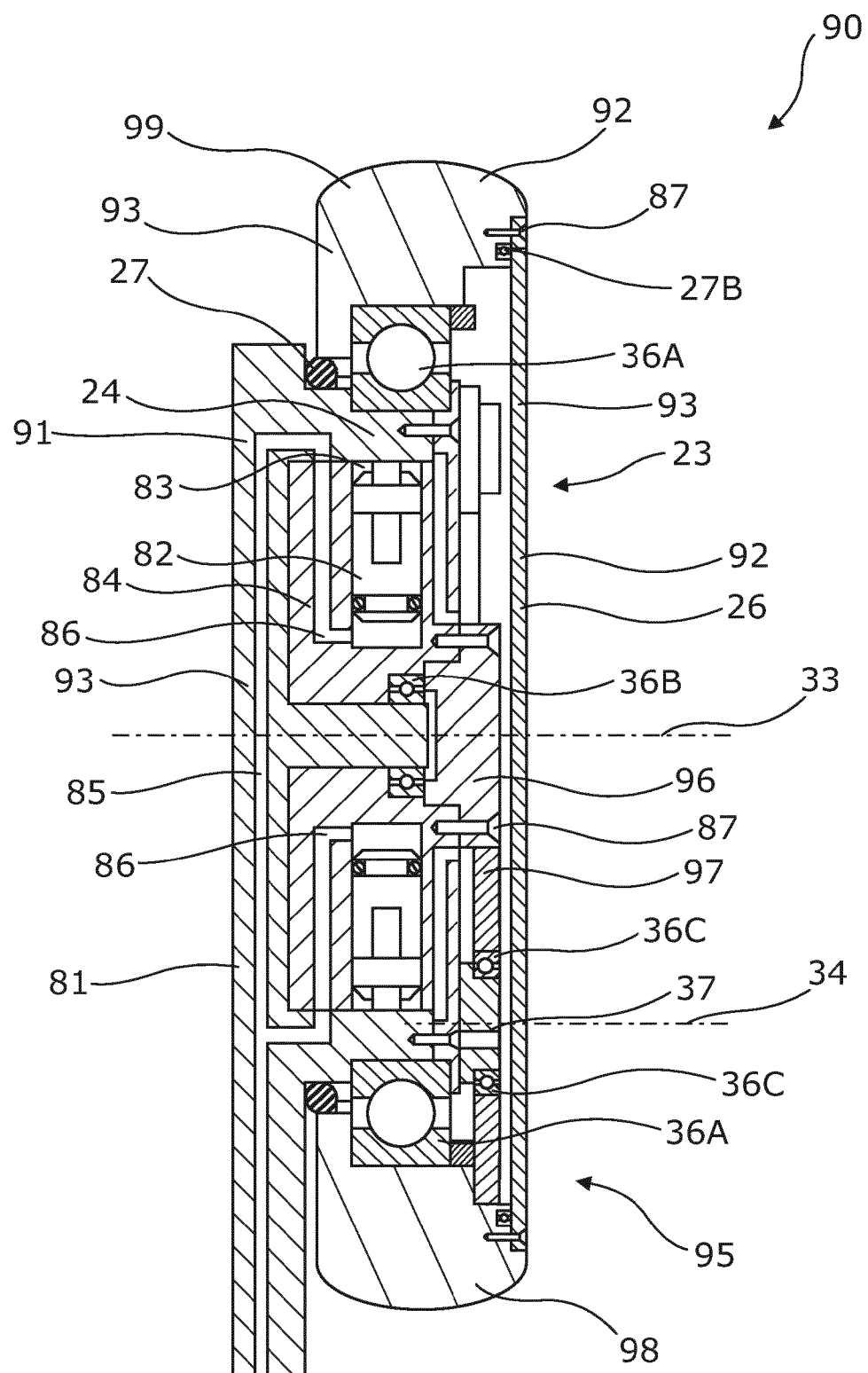
FIG. 6B shows a cross-sectional view of yet another embodiment of the wheel.

In FIG. 6B, the fluid channels for providing fluid to the hydraulic motor 23 in the wheel housing are arranged differently than in FIG. 6A to enable radial supply of the fluid channel to the hydraulic motor block.

Figure 8:
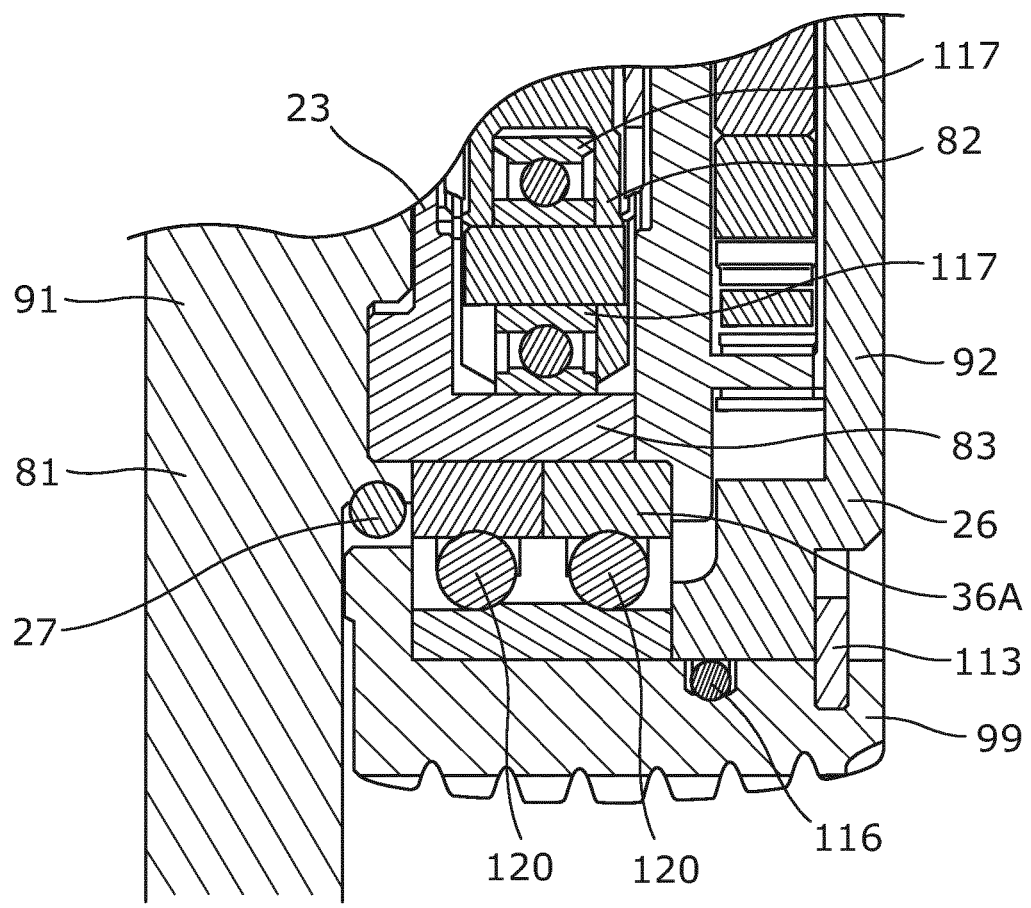
FIG. 8 shows a cross-sectional view of part of another embodiment of the wheel.

The wheel ring 99 rotates around the stationary part 91, and a ball bearing 36A is arranged therebetween. In FIG. 8, the ball bearing 36A comprises two rows of balls 120. In another embodiment, the ball bearings 36A, 36B may be replaced by needle bearings. As can be seen in FIG. 8, the pistons 82 of the hydraulic motor comprise ball bearings 117 arranged in one end opposite the end of the piston 82 moving within the cylinder.

Figure 9:
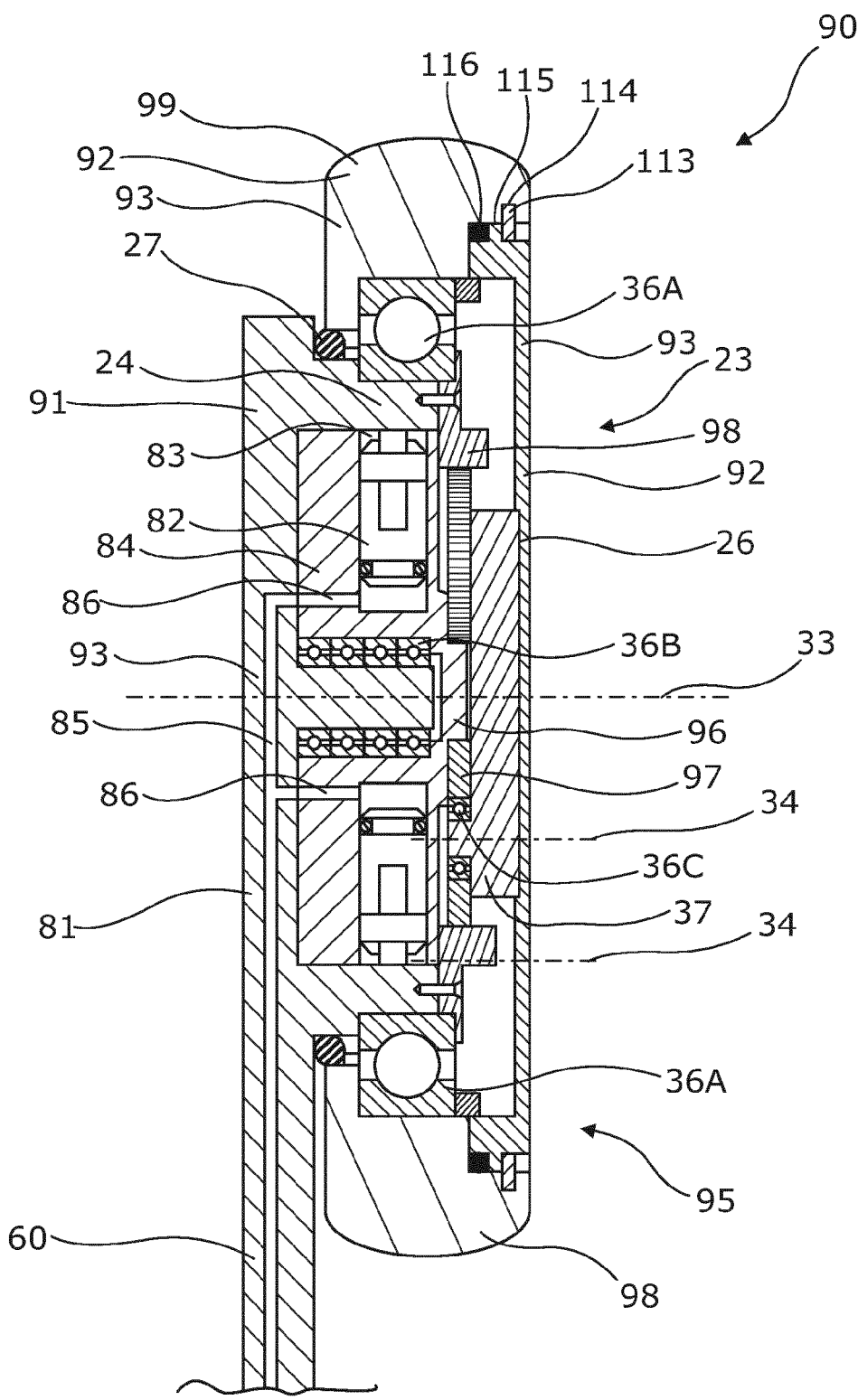
FIG. 9 shows a cross-sectional view of another embodiment of the wheel.

In FIG. 9, the rotatable section comprises the first sun gear 96 of the planetary gearing system 95 so that the sun gear forms part of the rotatable section 84 of the hydraulic motor and drive the plurality of planet gears 97 which are connected through the carrier member 37. The carrier member 37 is connected with the wheel ring 99, and the stationary part 91 comprises the ring gear 98 of the planetary gearing system 95, enabling the ring gear 98 to engage the planet gears 97 driving the carrier member and thus the closing member of the wheel ring. The ring gear 98 is fastened to the stationary part 91 and is thus stationary.

Figure 11:
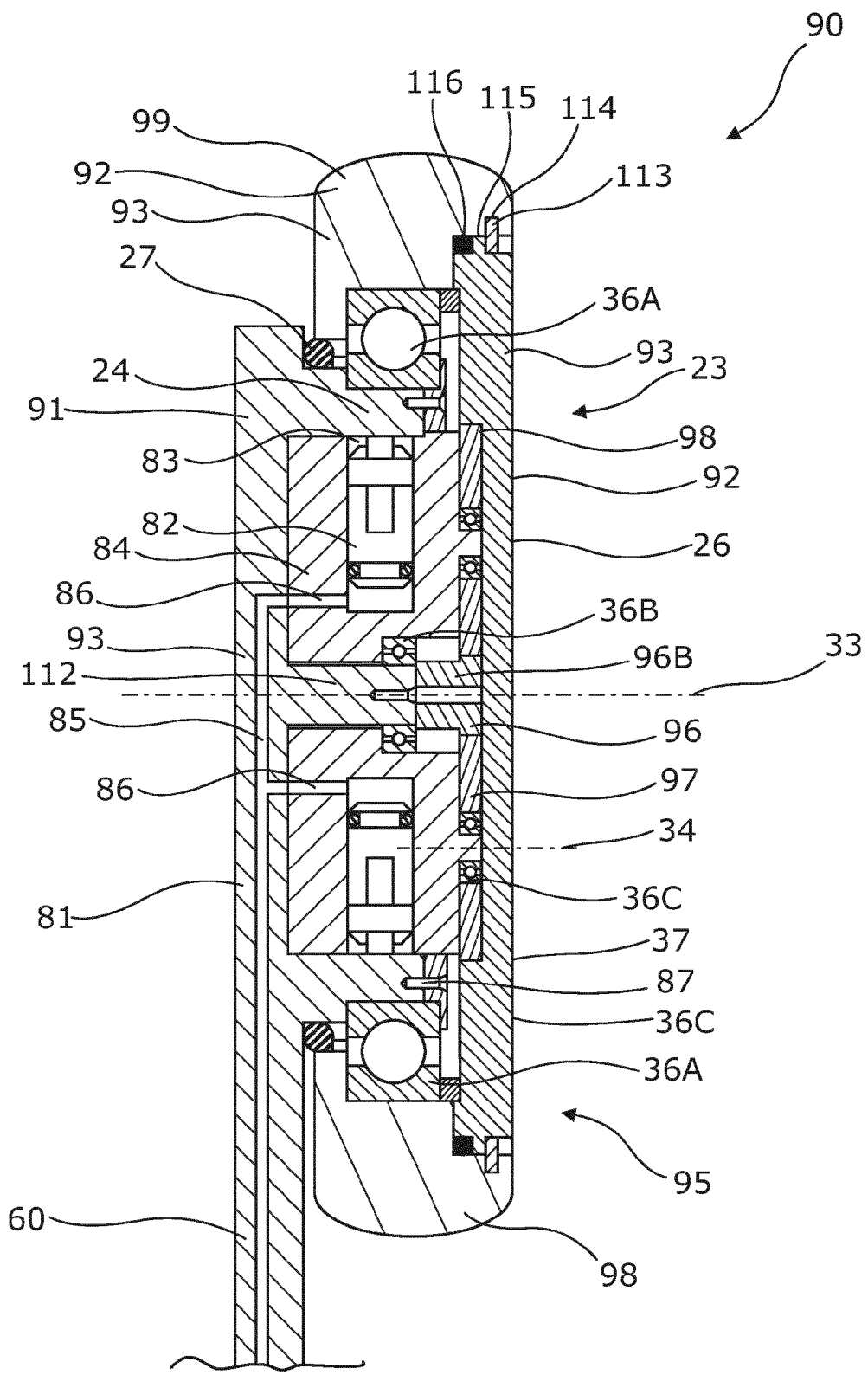
FIG. 11 shows a cross-sectional view of yet another embodiment of the wheel.

In FIG. 11, the rotatable section 84 of the hydraulic motor is connected with the planet gears 97, and the planet gears are thus driven by the rotatable section around the sun gear 96 fastened to a centre part 112 of the stationary part 91. The sun gear 96 is fastened to the centre part 112 around which part the rotatable section 84 of the hydraulic motor rotates. The rotatable section 84 has projections connected with the planet gears 97 through ball bearings 36C. The planet gears 97 engage the ring gear 98 which forms part of the closing member 26 connected with the wheel ring 99 through a snap ring 113. The rotatable section 84 rotates the planet gears 97 rotating around the stationary sun gear 96 engaging the ring gear 98 being comprised in the closing member 26.

Figure 10:
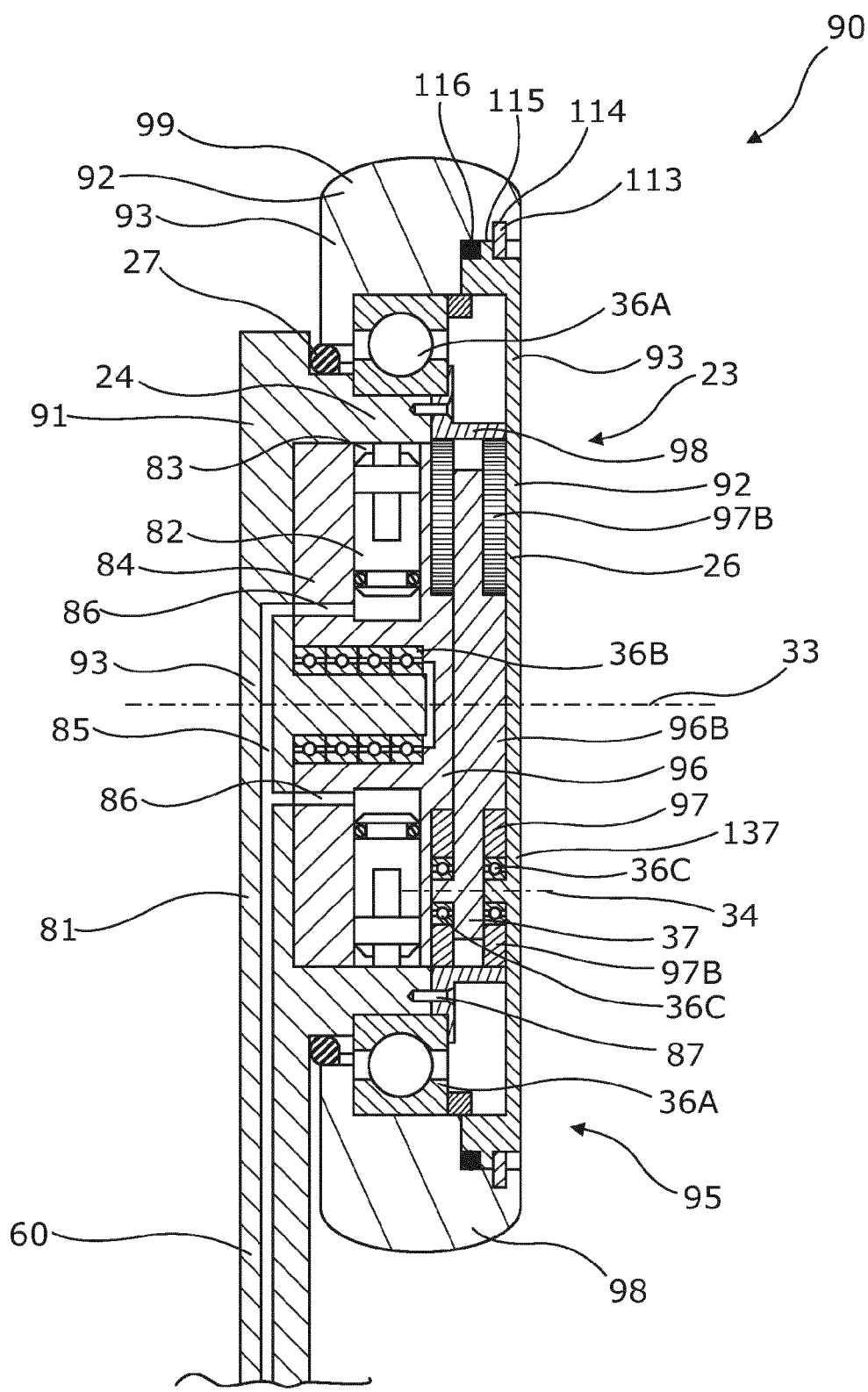
FIG. 10 shows a cross-sectional view of another embodiment of the wheel comprising a double gear.

In FIG. 10, the wheel assembly 90 comprises a double gearing system. The rotatable section 84 of the hydraulic motor comprises the first sun gear 96 of the planetary gearing system 95. Thus, the sun gear 96 is a projecting part of the rotatable section 84 and drives a plurality of first planet gears 97 which are connected through a carrier member 37. The carrier member 37 has projections on one side connected with the first planet gears 97 of the planetary gearing system 95 through ball bearings 36C. On the other side, the carrier member 37 has one projecting part forming a second sun gear 96 driving a plurality of second planet gears 97B. The first planet gears 97 and second planet gears 97B engage a stationary ring gear fixedly connected with the stationary part 91 by means of screws. The ring gear is also used to fasten the ball bearing 36A between the wheel ring 99 and the stationary part 91.

The second planet gears 97B are connected by means of a second carrier member 137 which is part of the closing member being connected with the wheel ring 99 by means of a snap ring 113 for rotating part of the wheel assembly 90. Thus, the second carrier member 137 is connected with the rotational part 92 of the wheel assembly 90 or is part of the rotational part 92.

Figure 12:
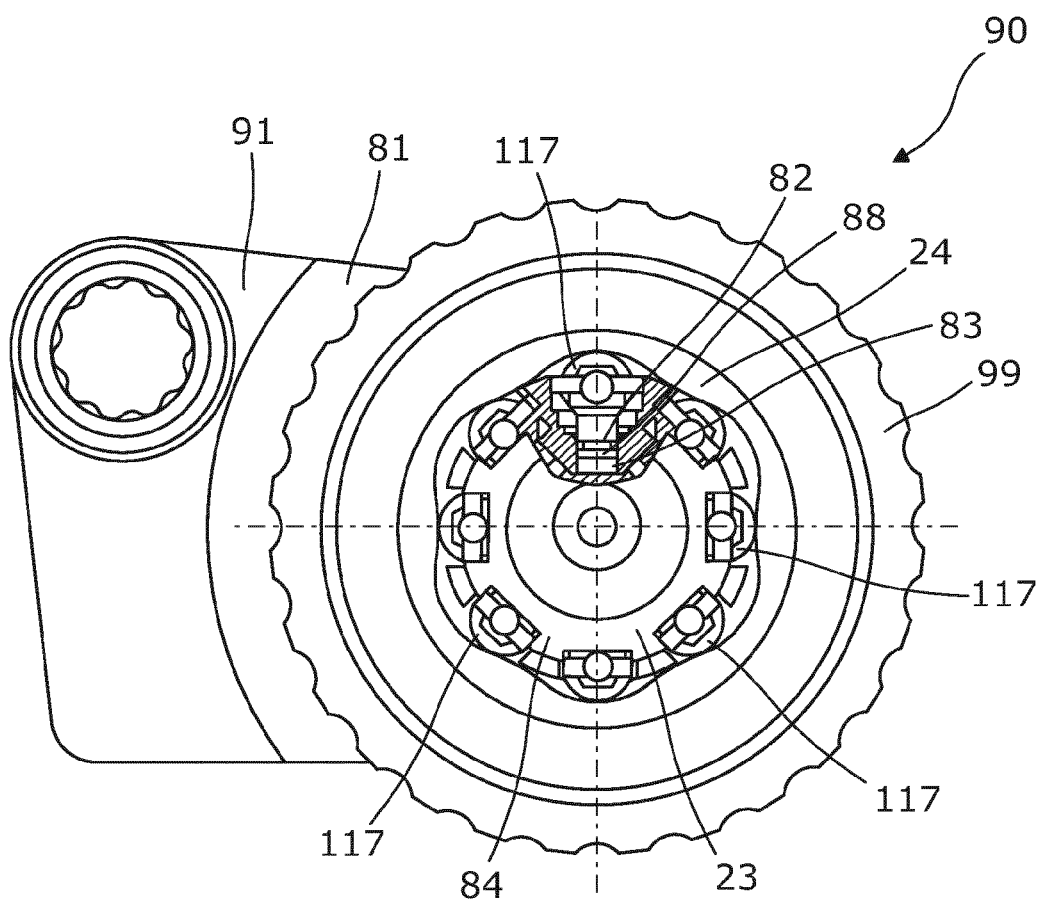
FIG. 12 shows another partly cross-sectional view of the hydraulic motor within the wheel.

In FIG. 12, the wheel assembly 90 is seen in a partly cross-sectional view showing the cam ring 24 and the pistons 82 of the hydraulic motor. The closing member 26 has been removed for illustrative purposes. As can be seen, the pistons 82 end in a ball bearing contacting the inner surface of the cam ring 24. When one piston 82 is forced outwards by hydraulic fluid in the fluid channels 86, another piston is forced inwards in the cylinder towards the rotational axis of the rotatable section of the hydraulic motor by the cam ring 24.

Furthermore, the fluid channels 86 in the hydraulic cylinder block supplying fluid to the motor are substantially parallel with the rotational axis of the wheel. The wheel arm 81 comprises fluid channels 85 aligned with the fluid channels 86 in the hydraulic cylinder block so that the fluid can flow freely from the arm to the motor when fluid is supplied to force the piston 82 of the hydraulic piston motor radially outwards. However, the fluid channels 85, 86 are unaligned when the piston 82 is no longer moved outwards. Then the fluid channels have moved to the next piston to be forced outwards in order to drive the rotatable section 84 of the hydraulic motor to rotate around the rotational axis 34. Only the channels supplying fluid to the motor are shown. However, other channels are arranged in the arm in order for the fluid to flow into said other channels when the cylinder is emptied when the piston 82 moves inwards towards the rotational axis. By having the fluid channels of the hydraulic cylinder block substantially parallel to the rotational axis of the wheel, the fluid channels are much easier to manufacture.

In order to be able to roll along the cam ring 24, the pistons moving in the cylinders of the hydraulic cylinder block are provided with a ball bearing 117. The central part of the ball bearing is suspended in a piston body of the piston, and an outermost part of the ball bearing abuts the cam ring, the ball bearing thus being capable of rotating in relation to the piston.

Figure 7:
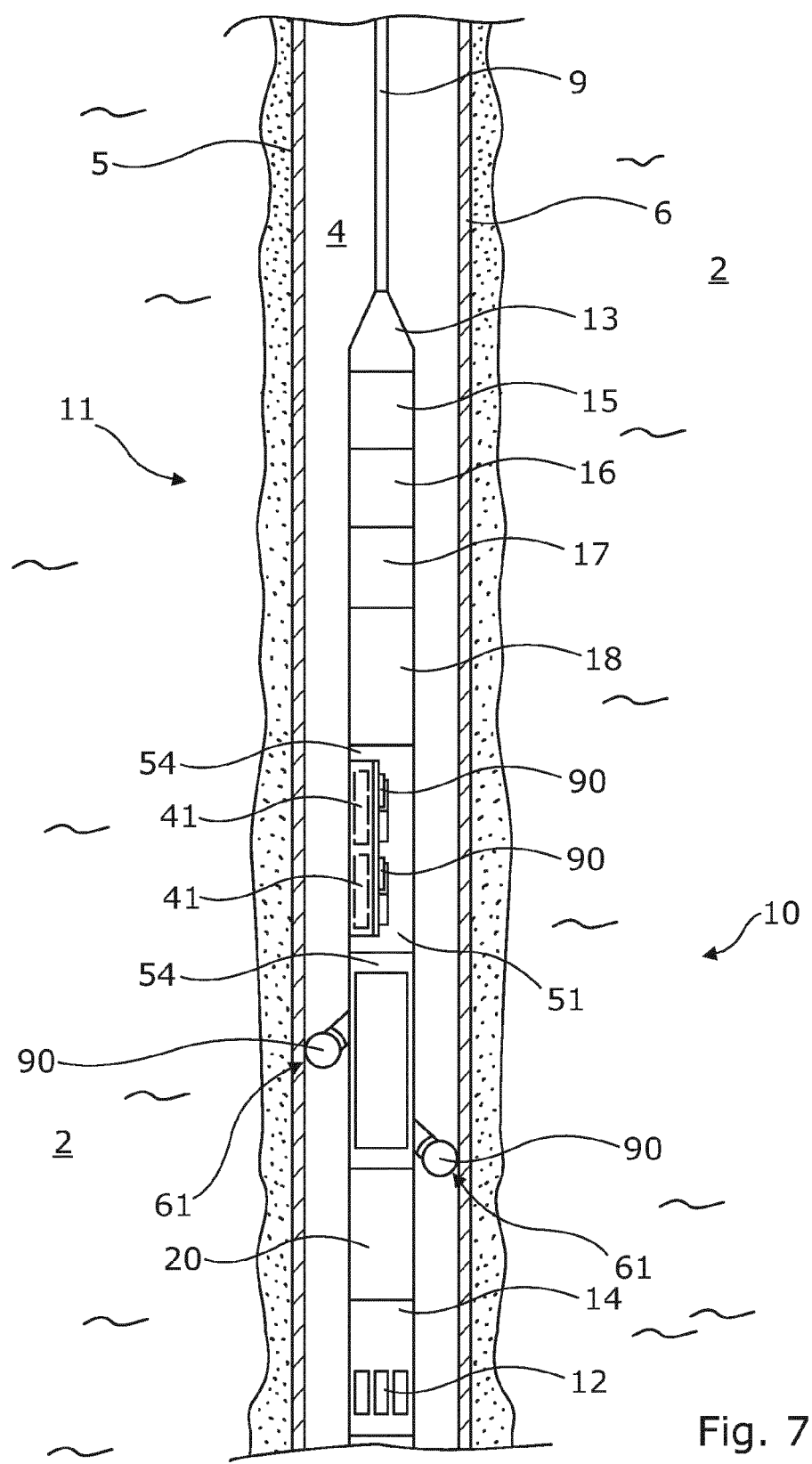
FIG. 7 shows a downhole system.

The invention further relates to a downhole system as shown in FIG. 7, in which the driving unit 11 is connected to an operational tool which, in this case, is a logging tool logging fluid and formation data. The operational tool could also be a stroker tool providing an axial force in one or more strokes, a key tool opening or closing valves in the well, positioning tools such as a casing collar locator (CCL), a milling tool or drilling tool, etc.

By well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

Although the invention has been described in the above in connection with preferred embodiments of the invention, it will be evident for a person skilled in the art that several modifications are conceivable without departing from the invention as defined by the following claims.

The invention claimed is:

1. A downhole driving unit for insertion into a well, comprising:
   a driving unit housing,
   an arm assembly movable between a retracted position and a projecting position in relation to the driving unit housing,
   an arm activation assembly arranged in the driving unit housing for moving the arm assembly between the retracted position and the projecting position, and
   a wheel assembly comprising a stationary part and a rotational part, the stationary part being connected with or forming part of the arm assembly and being rotatably connected with the rotational part,
   wherein the wheel assembly comprises a hydraulic motor comprising a hydraulic motor housing and a rotatable section connected with the rotational part for rotating part of the wheel assembly,
   wherein the arm assembly comprises a wheel arm and the wheel arm comprises fluid channels for providing fluid to and from the hydraulic motor through the stationary part.

2. A downhole driving unit according to claim 1, wherein the stationary part and the rotational part constitute the hydraulic motor housing.

3. A downhole driving unit according to claim 1, wherein the wheel assembly further comprises a planetary gearing system.

4. A downhole driving unit according to claim 3, wherein the planetary gearing system is comprised in the hydraulic motor housing.

5. A downhole driving unit according to claim 3, wherein the wheel assembly comprises a wheel ring.

6. A downhole driving unit according to claim 3, wherein the rotatable section of the hydraulic motor is connected with a sun gear of the planetary gearing system.

7. A downhole driving unit according to claim 6, wherein the sun gear of the planetary gearing system drives a plurality of planet gears which are connected through a carrier member for driving a ring gear of the planetary gearing system.

8. A downhole driving unit according to claim 7, wherein the wheel assembly comprises a wheel ring, and the wheel ring comprises the ring gear, enabling the planet gears to engage and drive the wheel ring.

9. A downhole driving unit according to claim 3, wherein the planetary gearing system comprises a ring gear constituted by a wheel ring or a closing member.

10. A downhole driving unit according to claim 3, wherein the rotatable section of the hydraulic motor is connected with planet gears and the planet gears are driven by the rotatable section.

11. A downhole driving unit according to claim 3, wherein the rotatable section of the hydraulic motor comprises a first sun gear of the planetary gearing system and the first sun gear drives a plurality of first planet gears which are connected through a carrier member.

12. A downhole driving unit according to claim 11, wherein the carrier member of the planetary gearing system drives a plurality of second planet gears and the carrier member comprises the sun gear engaging and driving the second planet gears.

13. A downhole driving unit according to claim 12, wherein the second planet gears are connected by means of a second carrier member being part of the rotational part for rotating part of the wheel assembly.

14. A downhole driving unit according to claim 1, wherein the hydraulic motor comprises fluid channels arranged in alignment with the fluid channels in the wheel arm so that fluid is led from the wheel arm to cylinders in the hydraulic motor.

15. A downhole driving unit according to claim 1, wherein the hydraulic motor is a radial piston motor.

16. A downhole driving unit according to claim 1, wherein the hydraulic motor comprises a cam ring connected with or forming part of the stationary part of the wheel assembly.

17. A downhole system comprising the driving unit according to claim 1 and an operational tool connected with the driving unit for being moved forward in a well or borehole.

18. A downhole system according to claim 17, wherein the operational tool is a stroker tool, a key tool, a milling tool, a drilling tool, a logging tool, etc.

* * * * *